(12) United States Patent
Wu et al.

(10) Patent No.: US 10,044,539 B2
(45) Date of Patent: Aug. 7, 2018

(54) METHODS AND DEVICES FOR DATA DEMODULATION

(71) Applicant: Lattice Semiconductor Corporation, Portland, OR (US)

(72) Inventors: Qiming Wu, Shanghai (CN); Bing Zhang, Shanghai (CN); Fei Song, Shanghai (CN)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 15/358,748

(22) Filed: Nov. 22, 2016

(65) Prior Publication Data

US 2017/0171004 A1 Jun. 15, 2017

(30) Foreign Application Priority Data

Dec. 10, 2015 (CN) .......................... 2015 1 0918305

(51) Int. Cl.
*H04B 3/46* (2015.01)
*H04B 17/00* (2015.01)
*H04Q 1/20* (2006.01)
*H04L 27/227* (2006.01)
*H04L 25/03* (2006.01)

(52) U.S. Cl.
CPC .... *H04L 27/2275* (2013.01); *H04L 25/03273* (2013.01); *H04Q 2213/03* (2013.01)

(58) Field of Classification Search
CPC .......... H04L 27/2275; H04L 25/03273; H04Q 2213/03; H04B 1/0475
See application file for complete search history.

(56) References Cited

U.S. PATENT DOCUMENTS

| 2005/0058234 A1* | 3/2005 | Stojanovic | H04L 7/0331 375/371 |
| 2005/0259774 A1* | 11/2005 | Garlepp | H04L 1/20 375/355 |
| 2008/0180289 A1* | 7/2008 | Su | H03M 1/002 341/120 |
| 2016/0072650 A1* | 3/2016 | Mobin | H04L 25/0278 375/219 |

* cited by examiner

*Primary Examiner* — Shuwang Liu
*Assistant Examiner* — Sung Ahn
(74) *Attorney, Agent, or Firm* — Haynes and Boone, LLP

(57) ABSTRACT

Embodiments of the present disclosure relate to methods and device for receiving PAM data stream. In an embodiment, a method comprises receiving a signal stream modulated with pulse amplitude modulation (PAM) associated with a plurality of bit patterns; determining boundary voltages for the plurality of bit patterns; and calibrating, based on the boundary voltages, a threshold voltage for use in recognition of the plurality of bit patterns. In this way, bit patterns may be accurately recognized based on the calibrated threshold voltage.

17 Claims, 13 Drawing Sheets

METHODS AND DEVICES FOR DATA DEMODULATION

CROSS-REFERENCE TO RELATED APPLICATION

This application claims priority to Chinese patent application No. 201510918305.5, filed on Dec. 10, 2015, which is incorporated by reference herein in its entirety.

FIELD OF THE DISCLOSURE

Embodiments of the present disclosure generally relate to modulation technology, and in particular, to methods and apparatuses for processing pulse amplitude modulated data streams.

BACKGROUND

Multilevel signals can be used to realize a high bandwidth data transmission in a loss transmission medium such as a cable. For example, pulse amplitude modulation (PAM) is often used to realize multilevel signals. As known, PAM is a form of signal modulation where the data is encoded in the amplitude of a series of signal pulses. It is an analog pulse modulation scheme in which the amplitudes of a train of carrier pulses are varied according to the sample value of the signal. Demodulation is performed by detecting the amplitude level of the carrier at every symbol period.

Amplitudes of signal streams at receivers are different for different cable losses. In order to recovery data correctly, threshold voltages of multilevel signal determination are essential. The demodulation recognizes different data patterns depending on those threshold voltages. Conventionally, the threshold voltages are manually set, which is usually constant and cannot fit all cases with different cable losses. Moreover, manually setting of the threshold voltages may cause false data recognition when cable loss varies.

SUMMARY

In general, example embodiments of the present disclosure provide methods and devices for receiving pulse amplitude modulated data stream In a first aspect, a method implemented by a device is provided. According to the method, a signal stream modulated with pulse amplitude modulation (PAM) associated with a plurality of bit patterns is received. Boundary voltages for the plurality of bit patterns are determined. A threshold voltage for use in recognition of the plurality of bit patterns is calibrated based on the boundary voltages.

In some embodiments, a clock for the signal stream is recovered. The boundary voltages for the signal stream are determined based on the recovered clock.

In some embodiments, a clock for the signal stream is recovered after calibrating the threshold voltage.

In some embodiments, a transition edge of a sampled signal stream associated with the received signal stream is determined. A phase clock and a data clock that are shifted from each other are determined based on the transition edge.

In some embodiments, a peak voltage for the signal stream is determined. The boundary voltages are determined based on the peak voltage.

In some embodiments, an initial threshold voltage is compared with voltages of the received signal stream in a first plurality of clock cycles. The initial threshold voltage is increased in response to the voltages of the signal stream exceeding the initial threshold voltage in at least one of the first plurality of clock cycles. The increased initial threshold voltage is determined to be the peak voltage in response to the voltages of the signal stream being below the initial threshold voltage in the first plurality of clock cycles.

In some embodiments, for a target bit pattern of the plurality of bit patterns, a first count associated with the target bit pattern in a second plurality of clock cycles is determined based on a reference threshold voltage. The reference threshold voltage is varied based on the target bit pattern. A second count associated with the target bit pattern in the second plurality of clock cycles is determined based on the varied reference threshold voltage. The boundary voltage for the target bit pattern is determined based on the first and second counts.

In some embodiments, a ratio between the second and first counts is determined. The boundary voltage for the target bit pattern is determined based on the varied reference threshold voltage in response to the ratio changing from a value less than a predetermined ratio to a value greater than the predetermined ratio or changing from a value greater than the predetermined ratio to a value less than the predetermined ratio, determining the boundary voltage for the target bit pattern based on the varied reference threshold voltage.

In some embodiments, the threshold voltage is determined as a median voltage of adjacent boundary voltages for two of the plurality of bit patterns.

In a second aspect, a device is provided. The device comprises at least one sampler operable to receive a signal stream modulated with PAM associated with a plurality of bit patterns; and a calibration circuit coupled to the at least one sampler and operable to determine boundary voltages for the plurality of bit patterns of the signal stream; and to calibrate based on the boundary voltages a threshold voltages for use in recognition of the plurality of bit patterns.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The term "logic" refers to a module such as circuitry for implementing certain functionality. In addition, in the context of the present disclosure, the terms "signal stream" and "data stream" can be used interchangeably for ease of discussion. Other definitions, explicit and implicit, may be included below.

In general, embodiments of the present disclosure are directed to a method and a device for threshold voltage calibration of pulse amplitude modulation (PAM) at a receiver in a serial communication system. Upon receipt of a signal stream modulated with PAM, the boundary voltages for the plurality of bit patterns associated with the PAM. As used herein, the term "bit pattern" refers to a pattern is a certain combination of bit value(s) in a serial data transmission system. For example, there are two levels in PAM-2 scheme and the patterns include "1" and "0." For PAM-4 scheme, there are four levels and the pattern includes "11", "10", "01" and "00." The boundary voltage refers to a voltage indicative of a boundary between two adjacent bit patterns. Based on determined the boundary voltages, one or more threshold voltages can be automatically recognized. The threshold voltage can then be used to distinguish and thus recognize the plurality of bit patterns. By use of the adaptive threshold calibrating, the demodulation can be done more precisely.

Figure 1:
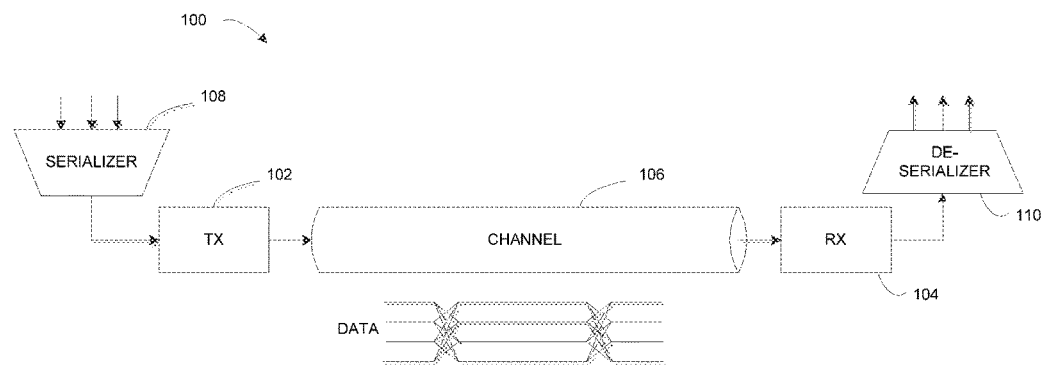
FIG. 1 is a simplified block diagram of an environment in which embodiments of the present disclosure can be implemented.

FIG. 1 shows a simplified block diagram of an environment in which embodiments of the present disclosure can be implemented. The environment 100 includes a transmitter (TX) 102, a receiver (RX) 104, a channel 106 therebetween, a serializer 108 and de-serializer 110. The serializer 108 is operable to convert a parallel data stream of relatively low speed to a serial data stream of relatively high speed. The transmitter TX 102 transmits the serial data stream via the channel 106 to the receiver RX 104 which passes the serial data stream to the de-serializer 110. The de-serializer 110 converts the serial data stream back to a parallel data stream.

In order to correctly recover data modulated with PAM at the receiver 104, threshold voltages for bit patterns associated with PAM need to be calibrated, as described above. The cable loss may cause a threshold voltage shift. As a result, certain data may be incorrectly recovered as erroneous data. Thus, embodiments of the present disclosure can be implemented at the receiver 104 to realize threshold voltage calibration.

Figure 2:
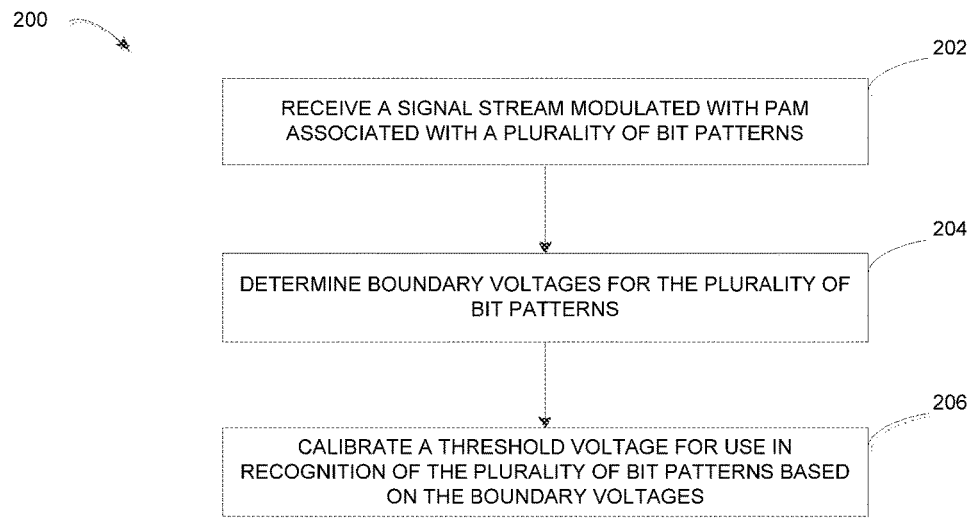
FIG. 2 is a flowchart illustrating calibration of a threshold voltage for use in recognition of a plurality of bit patterns in accordance with an embodiment of the present disclosure.

FIG. 2 shows a flowchart of a method for calibrating threshold voltage in accordance with embodiments of the present disclosure. The method 200 can be implemented by the receiver 104 of FIG. 1, for example. In step 202, a signal stream modulated with PAM associated with a plurality of bit patterns is received. The data represented by various bit patterns in the signal stream needs to be recovered. As described above, different PAM schemes are associated with different bit patterns to be distinguished. For example, in a PAM-2 scheme, it is necessary to distinguish two bit patterns, namely, "0" and "1." As another example, the four bit patterns in PAM-4 scheme are "00", "01", "10" and "11."

The bit patterns occupy their respective voltage segments which are separated by the boundary voltages. In step 204, boundary voltages for the plurality of the bit patterns are determined. After the boundary voltages are determined, the boundary voltages may be used to calibrate threshold voltage for use in recognition of the bit patterns. Example embodiments of step 204 will be discussed in detail in the following paragraphs.

The method 200 then proceeds to step 206, where the threshold voltage is calibrated based on the boundary voltages determined in step 204. The calibrated one or more threshold voltages can then be used to recognize the plurality of bit patterns. In this way, a correct recovering scheme can be established at the receiver, and data contained in subsequent data streams can be correctly recovered at the receiver.

Figure 3:
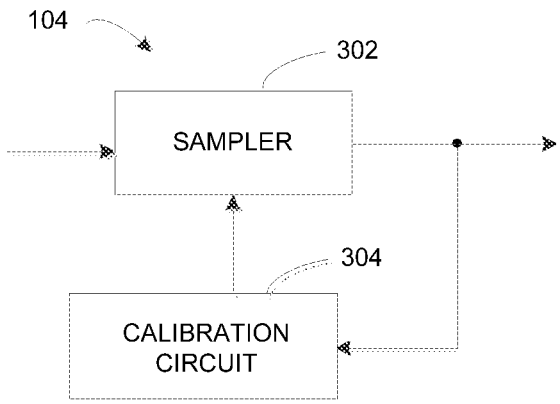
FIG. 3 is a simplified diagram of a device in accordance with an embodiment of the present disclosure.

As described above, the method 200 can be implemented by the receiver 104. FIG. 3 shows a simplified block diagram of the receiver 104 in accordance with an embodiment of the present disclosure. As shown, in this embodiment, the receiver 104 includes a sampler(s) 302 and a calibration circuit(s) 304 which are coupled to one another. In operation, the sampler 302 receives the signal stream (step 202 of the method 200) and sample data from the signal stream with clocks. The calibration circuit 304 determines boundary voltages for the plurality of bit patterns of the signal stream (step 204 of the method 200) and calibrates the threshold voltage(s) based on the boundary voltages (step 206 of the method 200).

Figure 4:
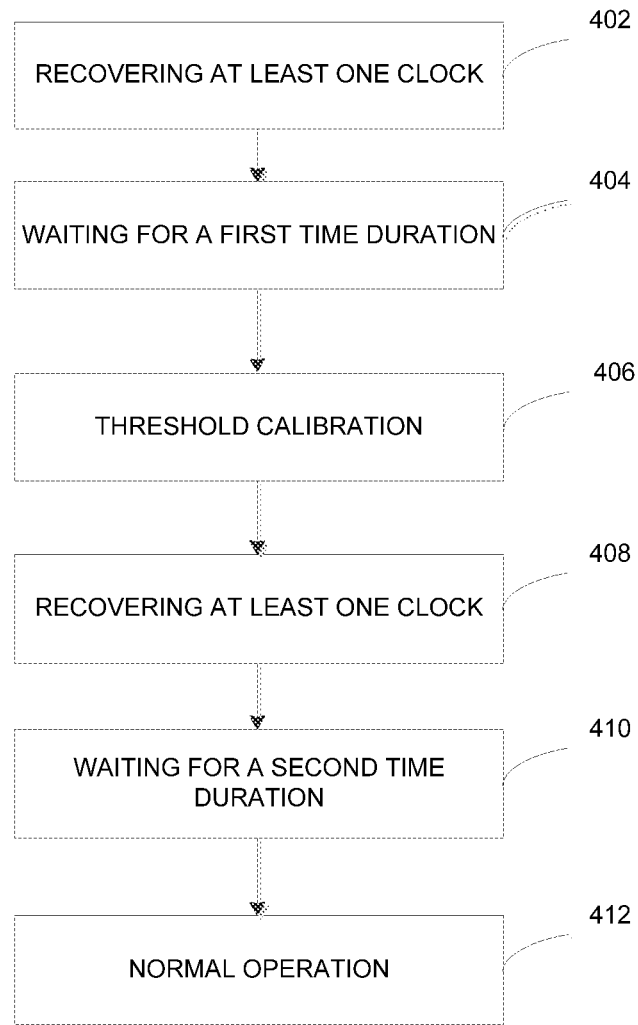
FIG. 4 is a flowchart illustrating an operation flow in accordance with embodiments of the present disclosure.

Now some example implementations will be discussed. FIG. 4 shows a flowchart of a method of threshold voltage calibration in accordance with embodiments of the present disclosure. The method 400 can be considered as an implementation of the method 200 as described above. In some embodiments, the method 400 can be carried out by the receiver 104 under the control of a state machine, for example.

Figure 5:
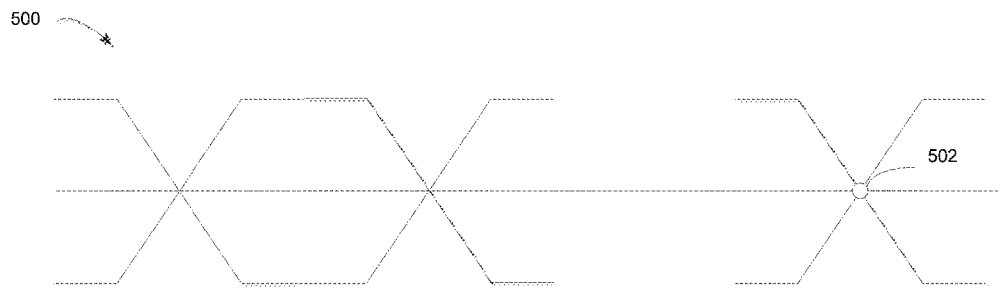
FIG. 5 shows a schematic data eye diagram and a transition edge in accordance with an embodiment of the present disclosure.

As shown, in step 402, upon receipt of a signal stream, one or more clocks are recovered. In an embodiment of the instant application, the one or more clocks are recovered coarsely with threshold voltages that are not calibrated. The recovering in step 402 is relatively coarse, as compared to clock recovering with calibrated threshold voltage in step 408. As known, in order to recover data in the signal stream, the receiver 104 needs at least one clock which can be of a same frequency as the data rate of the signal stream. In some embodiments, the clock may be provided by a separate party. Alternatively, in other embodiments, the receiver 104 can recover the clock from the received signal stream. For example, the clock may be recovered by sampling the signal stream and determining a transition edge of a sampled signal stream. A transition edge occurs at a cross point from a bit pattern to another bit pattern, for example as shown in FIG. 5. The transition edge 502 may be used by a clock data recovery (CDR) circuit to recover clocks. The recovered clock may at least include a data clock and a phase clock. Example embodiments in this regard will be described in the following paragraphs.

The method 400 then proceeds to step 404, where the receiver 104 waits for a first time duration. The length of the first time duration is configurable. For example, in some embodiments, the length of the first time duration may be configured such that the CDR circuit becomes steady during the first time duration. Specifically, in one embodiment, the first time duration may be configured in such a way that the CDR circuit is able to obtain the frequency and the phase is locked to be steady.

Then, in step 406, one or more threshold voltages are calibrated. As shown, the step 406 includes boundary voltage determination (step 204) and threshold voltage calibration (step 206). In some embodiments, the boundary voltages may be determined based on the clock recovered in step 402. Example embodiments for determining the boundary voltages will be discussed in the following paragraphs with reference to PAM-2 and PAM-4 schemes.

Next, in step 408, at least one clock is recovered. For example, in some embodiments, the clock may be recovered coarsely and finely since the threshold voltages are calibrated in step 406. As described with respect to step 402, the clocks recovered before step 406 is based on the threshold voltages that are not calibrated. The clocks recovered in this way are coarsely recovered clocks. In an embodiment of the present disclosure, the at least one clock in step 408 is recovered, for example, by the CDR 606 of FIG. 6 based on the calibrated threshold voltage. With the calibrated threshold voltage, the recovered clocks including the data clock and the phase clock are more accurate or finer.

In step 410, the receiver 104 waits for a second time duration. Similar to the first time duration used in step 404, the second time duration is configurable. In some embodiments, for example, the second time duration may be configured such that the CDR circuit which is used to recover the clock in step 408 becomes steady. For example, the length of the second time duration may be greater than or equal to the time duration that the CDR circuit obtains the frequency and the phase is locked to be steady. Then the receiver 104 may perform normal operations in step 412 with the calibrated threshold voltage.

Figure 6:
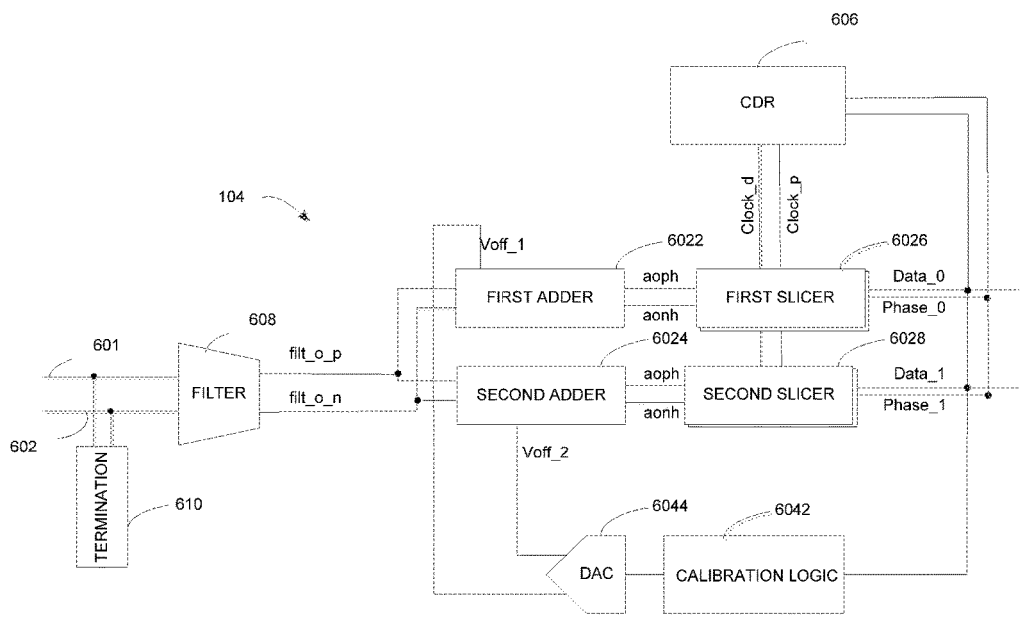
FIG. 6 is a simplified diagram of a device used in a PAM-2 scheme in accordance with an embodiment of the present disclosure.

Example embodiments of some features or functionalities as described above will now be discussed with reference to PAM-2. FIG. 6 shows a block diagram of an example implementation of the receiver 104 which is applicable to PAM-2 scheme. In this example, the receiver 104 includes a termination 510 for matching impedance, a filter 608 for filtering noise, first and second adders 6022 and 6044 and first and second slicers 6026 and 6028 for sampling signals, and calibration logic 6042 and a digital-to-analog converter (DAC) 6044 for calibrating threshold voltages. In some embodiments, the receiver 104 may be controlled by a state machine such that the receiver 104 in different states, such as recovering, waiting, calibration, recovering and normal operation as described above with FIG. 4.

In some embodiments, the received stream is a differential data stream includes positive input and negative inputs. In some embodiments, a differential data stream is received as a pair of signals on a pair of lines 601 and 602 in FIG. 6. Alternatively, in other embodiments, it is possible to receive the data stream with a single line. Termination circuit 510 provides an impedance matching for cable. The filter 608 is located before the adders 6022 and 6024 to compensate the cable loss and filter the noise such as high-frequency noise generated during the transmission. Any suitable filter, no matter currently known or to be developed in the future, may be used as the filter 608.

The filtered signal stream (filt_o_p, filt_o_n) is sampled by the adders 6022 and the slicer 6026 and by the adder 6024 and the slicer 6028. The sampling is performed under a clock provided by the CDR circuit 606. It would be appreciated that the adder 6022 and the slicer 6026 as a whole act as the sampler 302 as shown in FIG. 3. Likewise, the adder 6024 and the slicer 6028 as a whole act as another sampler 302. In the sampling, the adders 6022 and 6024 perform an operation of subtraction by subtracting a threshold voltage from voltages of the signal stream, while the slicers 6026 and 6028 convert output of the respective adders into a sampled signal stream associated with the plurality of bit pattern. In some alternative embodiments, a subtrator may be used. For example, the subtrator subtracts the voltage of the DAC 6044 from voltage of the differential signal stream.

As described above, the clock recovery can be done by the CDR circuit 606. Of course, instead of or in addition to the CDR circuit, the clock can be provided in any other suitable ways.

During recovering the at least one clock in step 402 of FIG. 4, a threshold voltage Voff_1 from the DAC 6044 to the first adder 6022 is 0. This still ensures operation of the CDR 606, because the voltage offset is much less than the amplitude of the signal.

Outputs and inputs of the first and second adders 6022 and 6024 may have a relationship described by equation below:

$$V(aoph, aonh) = gain*(V(filt\_o\_p, filt\_o\_n) - Voff\_x)$$

where V(aoph, aonh) represents the outputs of the first and second adders 6022 and 6024, gain represents the gain of the adders, V(filt_o_p, filt_o_n) represents the inputs of the adders, and Voff_x represents the threshold voltage from the DAC 6044 including Voff_1 and Voff_2 as shown in FIG. 6. As described above, in the embodiment, the threshold voltage Voff_1 may be set as zero.

During recovery of the coarse clock (step 402), V(aoph, aonh) is received by the first slicer 6026. In some embodiments, the first slicer 6026 may include a data slicer and a phase slicer (not shown). The data and phase slicers output at respective rising edges of clocks. For example, at the rising edge of "Clock_d" from the CDR 606, the output of the data slicer of the first slicer (denoted as "Data_0" in FIG. 6) equals to 1 if V(aoph, aonh) is greater than or equals to 0, and "Data_0" outputted from the data slicer of the first slicer is 0 if V(aoph, aonh) is smaller than 0. Similarly, at the rising edge of the signal "Clock_p" from the CDR 606, "Phase_0" outputted from the phase slicer of the first slicer equals to 1 if V(aoph, aonh) is greater than or equals to 0, and the output of the phase slicer of the first slicer (denoted as "Phase_0" in FIG. 6) equals to 0 if V(aoph, aonh) is smaller than 0.

"Data_0" and "Phase_0" are sent to the CDR 606 for clock recovering, while "Data_0" is sent to the calibration circuit comprising calibration logic 6042 and the DAC 6044. Clock recovering and calibration will be described below.

Figure 7A:
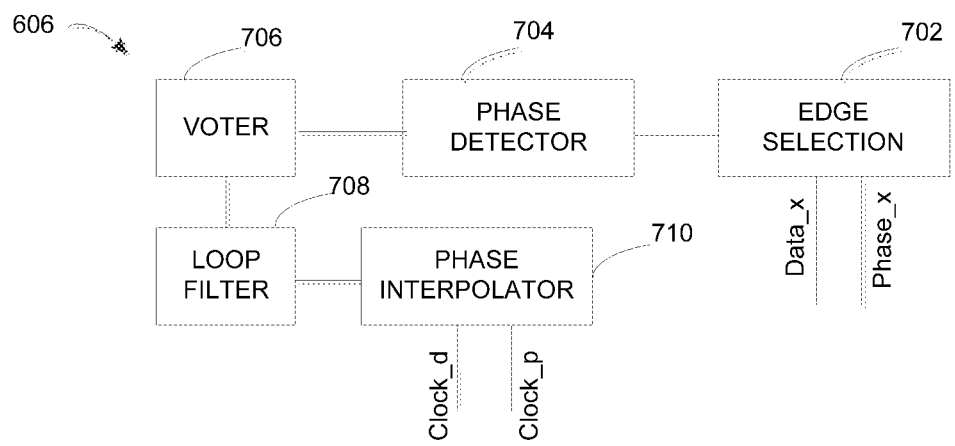
FIG. 7A is a schematic diagram illustrating an example of the clock data recovery circuit of FIG. 6.

FIG. 7A shows a block diagram illustrating an example of the CDR circuit 606 of FIG. 6. In this example, the CDR circuit 606 includes an edge selection circuit 702, a phase detector 704, a voter 706, a loop filter 708 and a phase interpolator 710. Inputs to the edge selection circuit 702 include "Data_x" and "Phase_x" (x=0 and 1). The edge selection circuit 702 is configured to determine a transition edge of a sampled signal stream associated with the received signal steam and to choose effective data transition edge for the phase detector 704. The CDR 606 may output a phase clock and a data clock that are shifted from each other based on the transition edge in an embodiment.

In a PAM-2 scheme, there is only one transition edge such as the transition edge 520 as shown in FIG. 5. This transition edge occurs at the cross point from bit pattern "1" to bit pattern "0" and from bit pattern "0" to bit pattern "1", and is considered to be effective transition edge. While in other PAM systems, such as PAM-4 and PAM-8, effective transition edges may be determined differently, as specifically described hereafter. The phase detector 704 may be implemented as a bang-bang phase detector, for example. The bang-bang phase detector is a non-linear phase detector using two data samples and one edge sample to provide sign information of phase error. In operation, the phase detector 704 receives the effective transition edge and uses the data transition edge, the previous data and the next data to indicate a flag of phase lead or phase lag. If the data transition edge is the same with next data, it indicates a phase lag. If the data transition edge is the same with previous data, it indicates a phase lead. It is to be understood that the edge-select circuit and the phase detector 704 are only example implementations, without suggesting any limitation as to the scope of the present disclosure. Any other suitable implementations, such as other digital phase detectors are possible as well.

Outputs of the phase detector 704 are fed into the voter 706. The voter 706 collects data and phase information within several unit intervals (UIs). If majority are phase lead, the voter 706 outputs the phase lead. If majority are phase lag, the voter 706 outputs the phase lag. It is to be understood that the voter 706 is only an example implementation, without suggesting any limitation as to the scope of the present disclosure. Any other suitable implementations are possible as well.

Figure 7B:
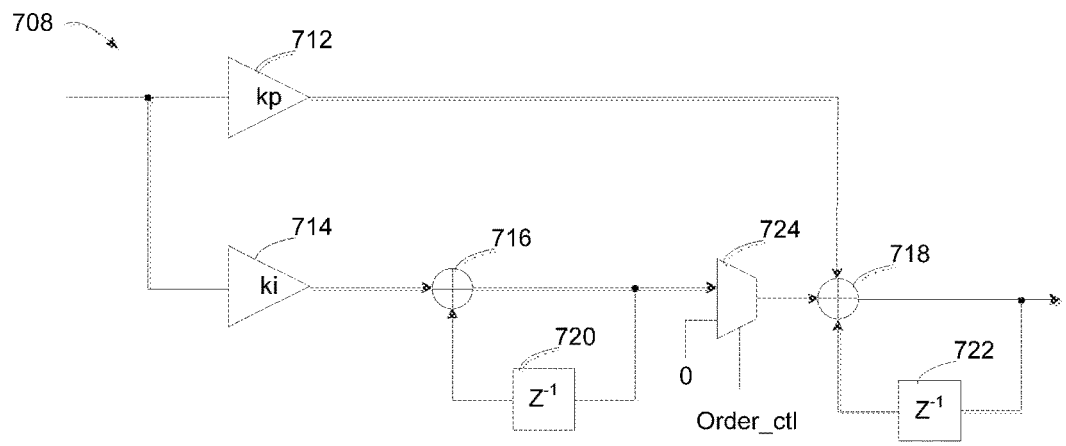
FIG. 7B is a schematic diagram illustrating an example of the loop filter of FIG. 7A.

Outputs of the voter 706 are sent to the loop filter 708. This loop filter 708 can be a one-order loop filter or a second order loop filter. An example of the loop filter 708 can be shown in FIG. 7B. The loop filter 708 in FIG. 7B can be a first order loop filter or a second order loop filter, depending on the enablement of the signal "Order_ctl". The loop filter 708 includes two gain paths. The first gain path includes a proportion gain module ("Kp") 712, where "Kp" represents proportion gain. The second gain path includes a gain module ("Ki") 714, adders 716 and 718, feedback modules 720 and 722 and an enabling unit 724, where "Ki" represents integration path gain. The signal "Order_ctl" is an order control for the loop filter, and can disable or enable integration path. It is to be understood that the loop filter 708 is only an example implementation, without suggesting any limitation as to the scope of the present disclosure. Any other suitable implementations are possible as well.

The outputs of the Loop filter are sent to the phase interpolator (PI) as PI control. The output of the PI "Clock_p" and "Clock_d" can be described by equation as below.

$$V(\text{Clock\_p}) = \text{pulse}\left(\sin\left(2*\pi*fc*t + V(\text{pi\_ctl})*2*\frac{\pi}{\text{pi\_num}}\right)\right)$$

$$V(\text{Clock\_d}) = \text{pulse}\left(\sin\left(2*\pi*fc*t + V(\text{pi\_ctl})*2*\frac{\pi}{\text{pi\_num}} + \pi\right)\right)$$

where fc represents central frequency of PI, V(pi_ctl) represents the PI control, and Pi_num represents PI division steps of 2*π (one clock cycle).

Figure 13:
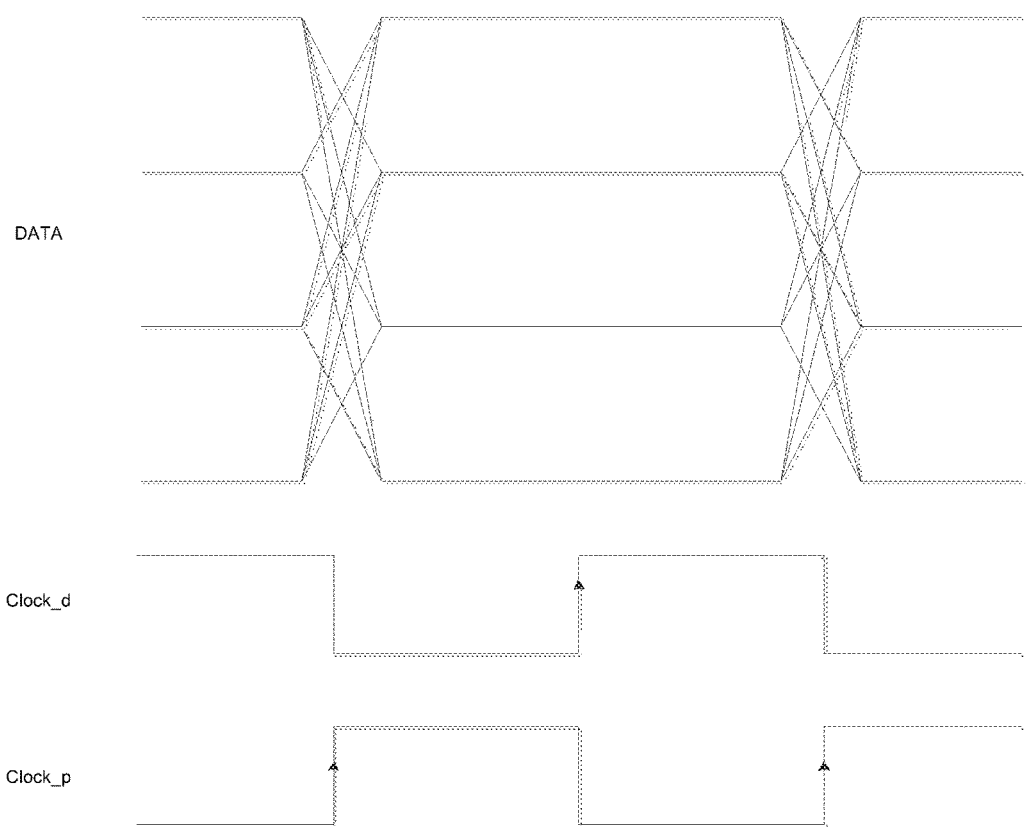
FIG. 13 is a schematic diagram illustrating recovered clocks aligned with the signal stream in a PAM-4 scheme in accordance with an embodiment of the present disclosure.

Upon the coarse lock, "Clock_p" and "Clock_d" have a phase relationship of shifting from each other by 180 degree, like the one shown in FIG. 13. After the clocks are recovered, the calibration circuit calibrates the threshold voltage. As shown, the calibration logic 6042 and the DAC 6044 as a whole may act as the calibration circuit. The DAC converts the digital values from the calibration logic into analog voltage for comparison with the voltages of the signal stream in the sampler.

Figure 8:
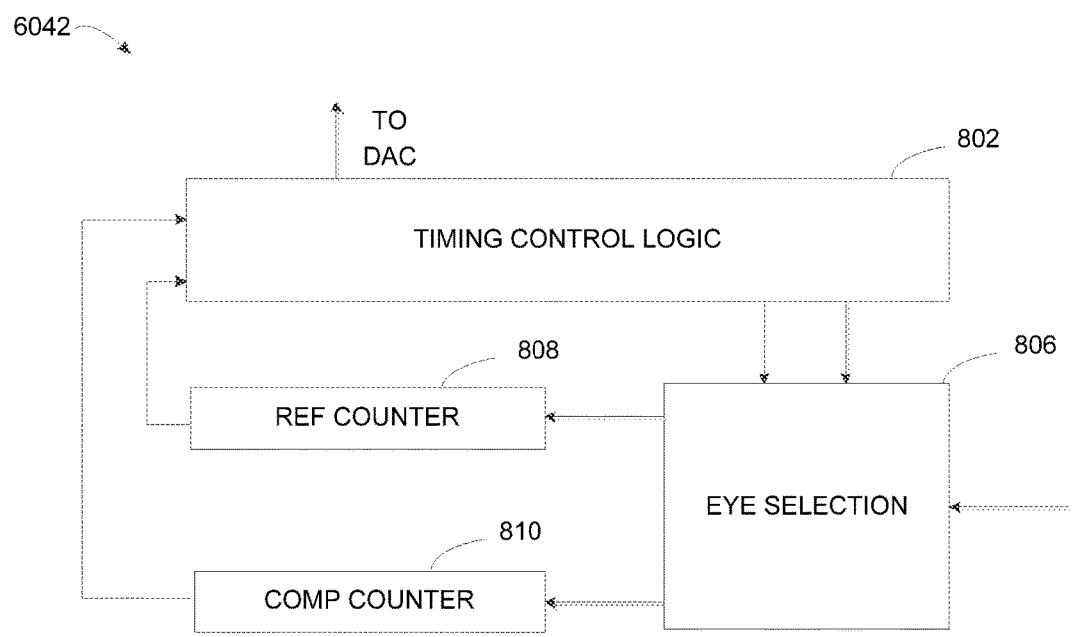
FIG. 8 is a schematic diagram illustrating an example of the calibration logic of FIG. 6.

FIG. 8 shows a schematic diagram illustrating an example of the calibration logic 6042 of FIG. 6. The calibration logic 7042 comprises an eye selection circuit 806, a reference counter 808, a comparison counter 810 and timing control logic 802. The calibration logic can be implemented in various manners, such as in digital logic circuit including field programmable gate array (FPGA) and application-specific integrated circuit (ASIC) and so forth.

The eye selection circuit 806 receives data from the slicers 6026 and 6028, and selects an eye associated with a bit pattern in the eye diagram under the control of the timing control logic 802. In order to calibrate the threshold voltage, the boundary voltages for bit patterns need to be determined.

Figure 9A:
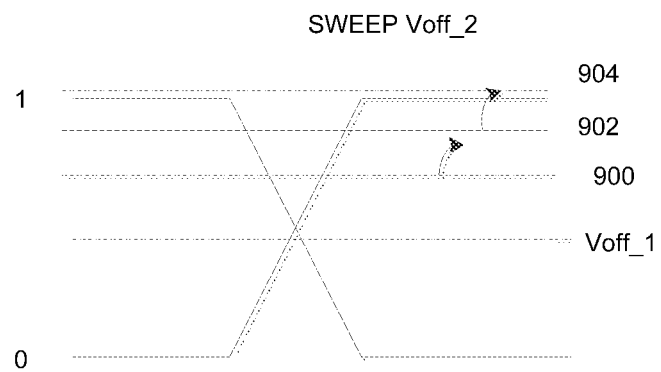
FIGS. 9A-9D are schematic diagrams illustrating examples of determining boundary voltages in a PAM-2 scheme in accordance with an embodiment of the present disclosure.
Figure 9B:
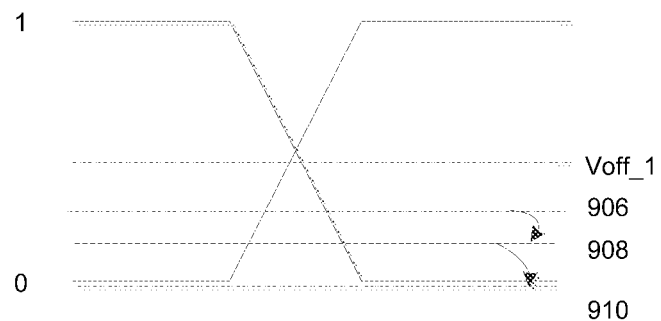

With reference to FIGS. 9A-9B, an example of determining boundary voltages in a PAM-2 scheme in accordance with an embodiment of the present disclosure is illustrated. FIG. 9A shows an example of determining boundary voltage for the bit pattern "1". In this embodiment, the threshold voltage Voff_1 is supplied with a reference threshold voltage of 0 during calibration. The threshold voltage Voff_2 is swept from an initial reference threshold voltage 900 less than the boundary voltage for the bit pattern "1" during the calibration. When V(filt_o_p, filt_on_n)≥Voff_1, "Data_0"=1. For first clock cycles, a first count of "Data_0"=1 associated with a first bit pattern is determined by the Ref counter 808. When V(filt_o_p, filt_on_n)≥Voff_2, "Data_1"=1. For the first clock cycles, a second count of "Data_1"=1 associated with the first bit pattern is determined by the Comp counter 810. The timing control logic 802 determines the ratio "Kr" between the second and first counts. The ratio "Kr" is computed by dividing the second count by the first count. If "Kr" is greater than a predetermined value "Kpd", the timing control logic 802 provides the DAC 6044 with a value such that the threshold voltage Voff_2 is increased, for example, from voltage 900 to voltage 902. In some embodiments, the predetermined value "Kpd" may be set as ½, for example.

The above process is repeated, if "Kr" is still larger than "Kpd", the threshold voltage Voff_2 is continued to increase, for example, from voltage 902 to voltage 904. As shown, when Voff_2 becomes the voltage 904, "Kr" is determined to be less than "Kpd". At this point, the boundary voltage for the first bit pattern "1", is determined, the voltage 904 is recorded as "RH" in the timing control logic 802.

Next, the boundary voltage for bit pattern "0" is determined in a similar fashion. With reference to FIG. 9B, the threshold voltage Voff_1 is supplied with a reference threshold voltage of 0 during calibration, and the threshold voltage Voff_2 is swept from an initial reference threshold voltage 906 greater than the boundary voltage for the bit pattern "0" during the calibration. When V(filt_o_p, filt_on_n)<Voff_1, "Data_0"=0. For second clock cycles, a first count of "Data_0"=0 associated with a second bit pattern is determined by the Ref counter 808. When V(filt_o_p, filt_on_n)<Voff_2, "Data_1"=0. For the second clock cycles, a second count of "Data_1"=0 associated with the second bit pattern is determined by the Comp counter 810. The timing control logic 802 determines the ratio "Kr" between the second and first counts. The ratio "Kr" is defined to divide the second count by the first count. If "Kr" is greater than a predetermined value "Kpd", for example, ½, the timing control logic 802 provides the DAC 6044 with a value such that the threshold voltage Voff_2 is decreased, for example, from voltage 906 to voltage 908. The above process is repeated, if "Kr" is still larger than "Kpd", the threshold voltage Voff_2 is continued to decrease, for example, from voltage 908 to voltage 910. As shown, when the threshold voltage Voff_2 becomes the voltage 910, "Kr" is determined to be less than "Kpd". At this point, the boundary voltage for second bit pattern "0" is determined, and the voltage 910 is recorded as "RL" in the timing control logic 802.

Figure 9C:
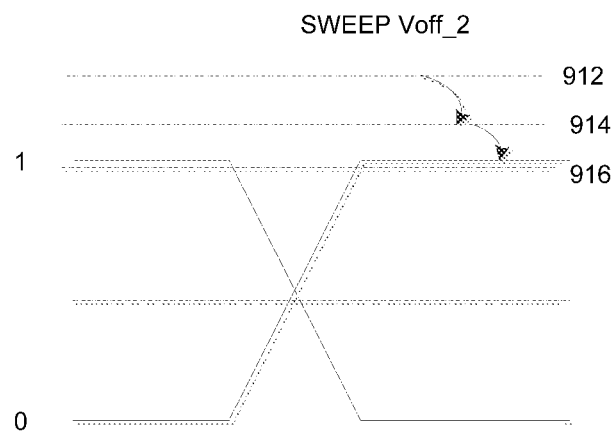
Figure 9D:
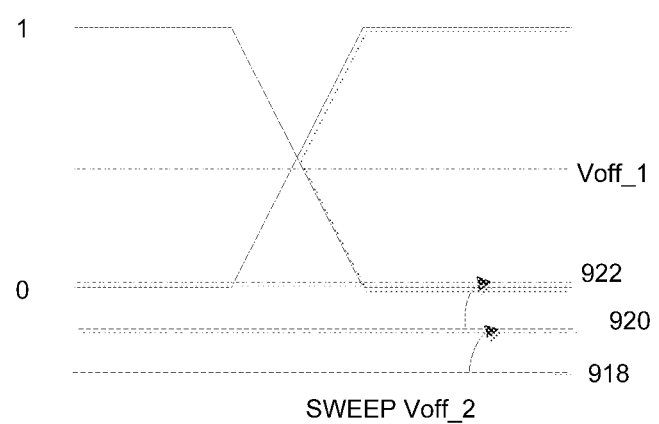

It is to be understood that the above process is only an example implementation, without suggesting any limitation as to the scope of the present disclosure. Any other suitable implementations are possible as well. For example, FIGS. 9C-9D shows another example of determining boundary voltages in a PAM-2 scheme in accordance with an embodiment of the present disclosure.

The threshold voltage Voff_1 is supplied with a reference threshold voltage of 0 during calibration. The threshold voltage Voff_2 is swept from an initial reference threshold voltage 912 greater than the boundary voltage for the bit pattern "1" during the calibration. When V(filt_o_p, filt_on_n)≥Voff_1, "Data_0"=1. For a first clock cycles, a first count of "Data_0"=1 associated with a first bit pattern is determined by the Ref counter 808. When V(filt_o_p, filt_on_n)≥Voff_2, "Data_1"=1. For the first clock cycles, a second count of "Data_1"=1 associated with the first bit pattern is determined by the Comp counter 810. The timing control logic 802 determines the ratio "Kr" between the second and first counts. The ratio "Kr" is defined to divide the second count by the first count. If "Kr" is less than a predetermined value "Kpd", for example, ½, the timing control logic 802 provides the DAC 6044 with a value such that the threshold voltage Voff_2 is decreased, for example, from voltage 912 to voltage 914. The above process is repeated, if "Kr" is still less than "Kpd", the threshold voltage Voff_2 is continued to decrease, for example, from voltage 914 to voltage 916. As shown, when the threshold voltage Voff_2 becomes the voltage 916, "Kr" is determined to be greater than "Kpd". At this point, the boundary voltage for the first bit pattern ("1") is determined, and the voltage 916 is recorded as "RH" in the timing control logic 802.

Next, the boundary voltage for bit pattern "0" is determined similarly. With reference to FIG. 9D, the threshold voltage Voff_1 is supplied with a reference threshold voltage of 0 during calibration, and the threshold voltage Voff_2 is swept from an initial reference threshold voltage 918 less than the boundary voltage for the bit pattern "0" during the calibration. When V(filt_o_p, filt_on_n)<Voff_1, "Data_0"=0. For a second clock cycles, a first count of "Data_0"=0 associated with a second bit pattern is determined by the Ref counter 808. When V(filt_o_p, filt_on_n)<Voff_2, "Data_1"=0. For the second clock cycles, a second count of "Data_1"=0 associated with the second bit pattern is determined by the Comp counter 810. The timing control logic 802 determines the ratio "Kr" between the second and first counts. The ratio "Kr" is defined to divide the second count by the first count. If "Kr" is less than a predetermined value "Kpd", for example, ½, the timing control logic 802 provides the DAC 6044 with a value such that the threshold voltage Voff_2 is increased, for example, from voltage 918 to voltage 920. The above process is repeated, if "Kr" is still less than "Kpd", the threshold voltage Voff_2 is continued to increase, for example, from voltage 920 to voltage 912. As shown, when the threshold voltage Voff_2 becomes the voltage 912, "Kr" is determined to be greater than "Kpd". At this point, the boundary voltage for second bit pattern ("0") is determined, and the voltage 912 is recorded as "RL" in the timing control logic 802.

It is to be understood that "Kpd" being ½ is only an example. Any other suitable values less than 1 are possible as well. Also, larger "Kpd" is preferred, especially when signal quality is bad, because larger "Kpd" contributes better calibration performance. It would be appreciated that a larger "Kpd" would result in a smaller voltage difference between adjacent boundary voltages, and the eye height and width are smaller in the situation of bad signal quality. In this case, larger "Kpd" would cause a better calibration.

Next, the threshold voltage for normal operation is calibrated. In an embodiment, the threshold voltage is determined to be a median voltage between adjacent boundary voltages. In the PAM-2 scheme, the threshold voltage is the median voltage between the boundary voltages 904 and 910 or between the boundary voltages 916 and 912. This threshold voltage is provided as the threshold voltage Voff_2 for subsequent normal operation, such as the normal operation in step 412 of FIG. 4.

With the calibrated threshold voltage, the device enters a state of fine lock. At this time, the CDR 606 recovers at least one clock based on "Data_1" and "Phase_1", instead of based on "Data_0" and "Phase_0". It is to be understood that previous coarse lock is applicable here too.

With "Clock_d" and "Clock_p" based on the calibrated threshold voltage, the device steps into normal operation. Through the above described process, the threshold voltage is automatically calibrated no matter what the cable loss is.

The above embodiment is described with reference to the PAM-2 scheme. It is to be understood that it can be applied to other PAM systems, such as PAM-4 and PAM-8 and so on. In order to further demonstrate various aspects of the present disclosure, a method and a device for PAM-4 will be described below.

Figure 10:
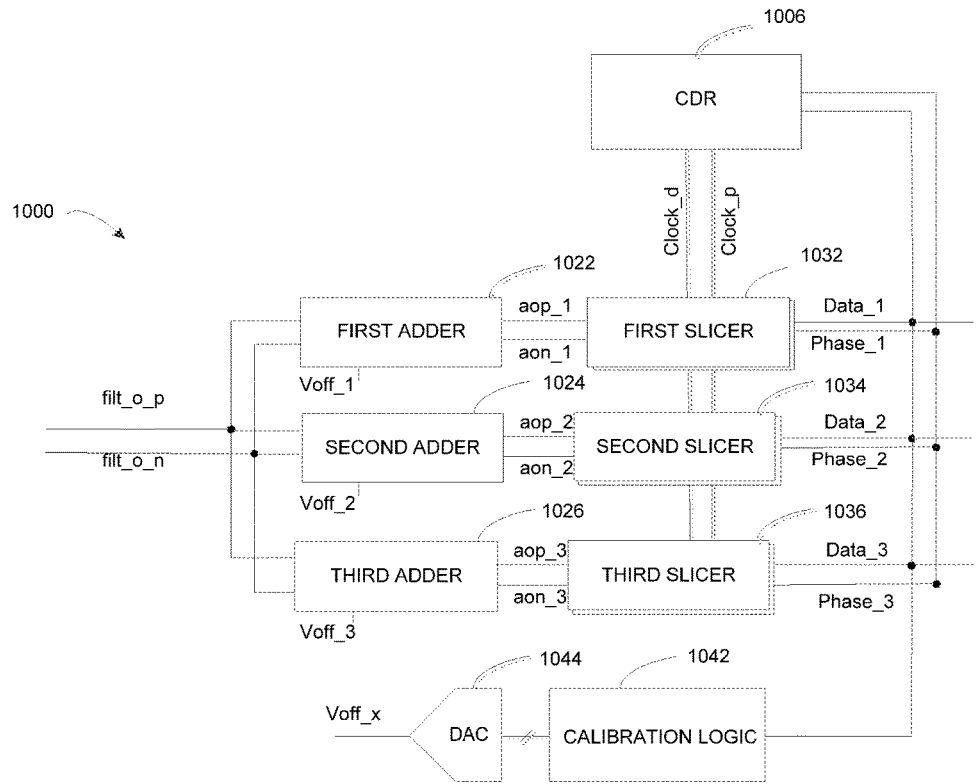
FIG. 10 is a simplified diagram of a device used in a PAM-4 scheme in accordance with an embodiment of the present disclosure.

FIG. 10 shows a simplified block diagram of a device 1000 used in a PAM-4 scheme in accordance with an embodiment of the present disclosure. The device 1000 is analogous to the receiver 104 of FIG. 5. The difference between them is that the receiver 104 of FIG. 5 is adapted to a PAM-2 scheme, while the device of FIG. 10 is adapted to a PAM-4 scheme.

The device 1000 comprises three samplers, a calibration circuit and a CDR circuit 1006. Each sampler may be analogous to the sampler 302 of FIG. 3 or the sampler of FIG. 6, and comprises an adder and a slicer. CDR 1006 may be analogous to the CDR 606 of FIG. 6 or the CDR 606 of FIG. 7A. Thus, detailed configuration of the CDR 1006 and its operation are omitted here. The calibration circuit comprises calibration logic 1042 and a DAC 1044. The calibration logic 1042 and the DAC 1044 are analogous to the calibration logic 6042 and the DAC 6044. Thus, detailed configuration of the calibration logic 1042 and its operation principle are omitted here.

In this embodiment, the first sampler comprises a first adder 1022 and a first slicer 1032, the second sampler comprises a second adder 1024 and a second slicer 1034, and the third sampler comprises a third adder 1026 and a third slicer 1036. The adders and the slicers of FIG. 10 operates in a similar way to those of FIG. 6. Outputs and inputs of the adders have the relationship below.

$$V(aop\_1, aon\_1) = gain * (V(filt\_o\_p, filt\_o\_n) - Voff\_1)$$

$$V(aop\_2, aon\_2) = gain * (V(filt\_o\_p, filt\_o\_n) - Voff\_2)$$

$$V(aop\_3, aon\_3) = gain * (V(filt\_o\_p, filt\_o\_n) - Voff\_3)$$

where V(aop_x, aon_x) represents the outputs of the first, second and third adders 1022, 1024 and 1026, gain represents the gain of the adders, V(filt_o_p, filt_o_n) represents the inputs of the adders, and Voff_x represents the threshold voltage from the DAC 1044 including Voff_1, Voff_2 and Voff_3 as shown in FIG. 10. In the embodiment, the threshold voltage Voff_2 may be set as zero.

The phase slicers output "Phase_x" at rising edges of the signal "Clock_p". The data slicers output "Data_x" at rising edges of Clock_d, wherein x=1, 2 and 3. Taking the first slicer for example, at the rising edge of the signal "Clock_p", if V(aop_1, aon_1)>=0, "Phase_1"=1; if V(aop_1, aon_1)<0, "Phase_1"=0; at the rise edge of the signal "Clock_d", if V(aop_1, aon_1)>=0, "Data_1"=1; if V(aop_1, aon_1)<0, "Data_1"=0. The second and third slicers operate similarly.

The signals "Data_x" and "Phase_x" (x=1, 2 and 3) are sent to the CDR 1006 for recovering the signals "Clock_d" and "Clock_p". The signal "Data_x" is sent to the calibration logic 1042 for threshold voltage calibration.

Figure 11:
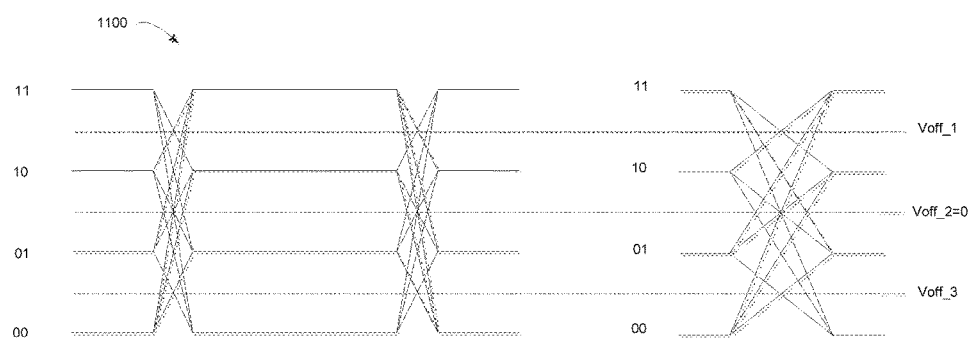
FIG. 11 shows a schematic data eye diagram and transition edges in a PAM-4 scheme.

With reference to FIG. 11, it shows a schematic data eye diagram and transition edges in a PAM-4 scheme. The data eye diagram is shown on the left side of FIG. 10, while data transition edges are shown on the right side of FIG. 10. As shown, voltages of PAM-4 signal stream are divided into segments corresponding to 4 bit patterns ("11", "10", "01" and "00"). In the embodiment of FIG. 10, the threshold voltage Voff_2, which is supplied to the second adder 1024, is constantly set to be 0. For a differential input waveform, it is intrinsically in the center of eye-diagram.

At the step of recovering at least one clock, like step 402, the threshold voltages Voff_1 and Voff_3 are not determined. Because the threshold voltages Voff_1 and Voff_3 are determined by threshold voltage calibration. At this time, only the threshold voltage Voff_2 is utilized to decide data transition edges. As shown, three cross points depicted with solid circles is determined for data transition, and these cross points are all determined to be effective transition edges. The CDR 1006 recovers the signals "Clock_p" and "Clock_d" with these effective transition edges in a similar manner as that described with respect to the CDR 606. This is called CDR coarse lock.

Upon a first time duration, the state machine controls the device 1000 to enter the state of calibration. Details for the calibration in the PAM-4 scheme are set forth below.

Figure 14A:
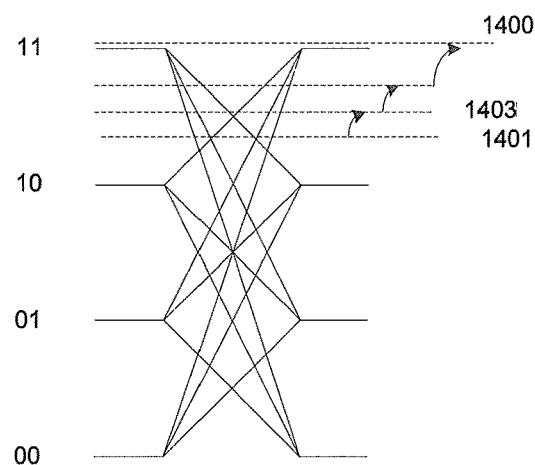
FIGS. 14A-14E are schematic diagrams illustrating peak determination and boundary voltages determination in accordance with an embodiment of the present disclosure.

For a PAM system other than PAM-2 scheme, it is preferred to determine a peak voltage of the signal stream first. For a PAM-N scheme (N>=4), a peak voltage for the signal stream may be determined at the stage of calibration, and the boundary voltages for the signal stream may be determined based on the peak voltage. More specifically, determining the peak voltages comprises comparing an initial threshold voltage with voltages of the received signal stream in a first plurality of clock cycles; in response to the voltages of the signal stream exceeding the initial threshold voltage in at least one of the first plurality of clock cycles, increasing the initial threshold voltage; and in response to the voltages of the signal stream being below the initial threshold voltage in the first plurality of clock cycles, determining the increased initial threshold voltage to be the peak voltage, e.g., as shown in FIG. 14A. With reference to FIG. 14A, it shows peak determination and boundary voltages determination in accordance with an embodiment of the present disclosure.

The calibration logic 1042 provides an initial digital value such that the DAC 1044 supplies the first adder 1022 with an initial threshold voltage. The initial threshold voltage is compared with V(filt_o_p, filt_o_n) for a first clock cycles. If "Data_1" is not all "0" during the first clock cycles, the timing control logic varies the initial digital value such that the initial threshold voltage increases, for example from the voltage 1401 to the voltage 1403. If "Data_1" is all "0" during the first clock cycles, the peak voltage Vp 1400 is determined, and the initial digital value corresponding to the peak voltage 1400 is recorded as maxdiff; otherwise, the initial threshold voltage continues to increase. This process is illustrated in FIG. 14A.

Next, the boundary voltages for the four bit patterns are determined based on the peak voltage 1400 as below. In an embodiment of the present disclosure, determining the boundary voltages for bit pattern may comprise determining a first count associated with the target bit pattern in a second plurality of clock cycles based on a reference threshold voltage; varying the reference threshold voltage based on the target bit pattern; determining a second count associated with the target bit pattern in the second plurality of clock cycles based on varied reference threshold voltage; and determining the boundary voltage for the target bit pattern based on the first and second counts. In an embodiment of the present disclosure, determining the boundary voltages for bit pattern may comprise determining a ratio between the second and first counts; in response to the ratio changing from a value less than a predetermined ratio to a value greater than the predetermined ratio or changing from a value greater than the predetermined ratio to a value less than the predetermined ratio, determining the boundary voltage for the target bit pattern based on the varied reference threshold voltage. In an embodiment of the present disclosure, the threshold voltage may be determined as a median voltage of adjacent boundary voltages.

Figure 14B:
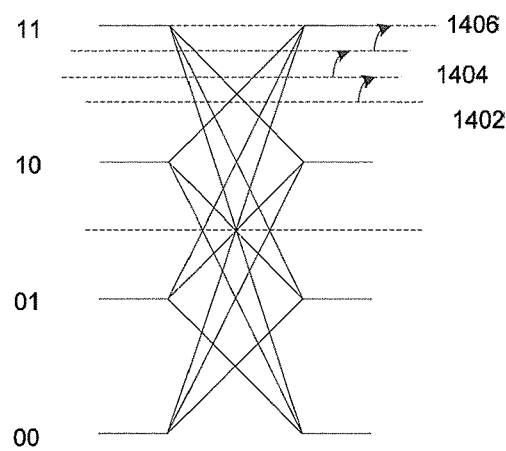
Figure 14C:
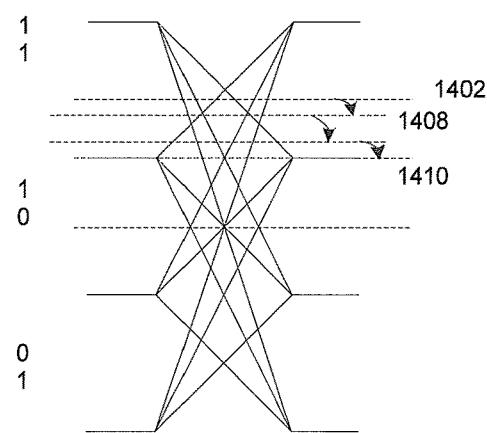

The boundary voltage for bit pattern "11" is determined as below with reference to FIG. 14B. The calibration circuit provides a reference threshold voltage 1402 of Vp*⅔ as the initial offset for the up eye. It is to be understood that the value ⅔ is exemplary only, other values, such as ¾, are possible. During a second clock cycles, when "Data_3"=1 and "Data_2"=1 occur, it is considered that the bit pattern "11" occurs. For a second clock cycles, a first count of the bit pattern "11" is counted by the Ref counter. As shown, the reference threshold voltage is increased, for example from the voltage 1402 to the voltage 1404. During another second cycles, when "Data_1"=1 and "Data_2"=1 occur, it is considered that the bit pattern "11" occurs. For the second clock cycles, a second count of the bit pattern "11" is counted by the Comp counter. A ratio "Kr" is determined between the second and first counts, and "Kr" is defined to divide the second count by the first count. If "Kr" is greater than a predetermined value "Kpd", such as ½, the reference threshold value continues to increase, and the above process is repeated. If "Kr" is determined to be less than or equal to "Kpd", the boundary voltage 1406 for bit pattern "11" is determined as "RH_h".

It is to be understood that the above approach is only an example implementation, without suggesting any limitation as to the scope of the present disclosure. Any other suitable implementations are possible as well. For example, the Comp counter may take a count of "Data_3"=1 and "Data_2"=1, and the "Kpd" may be adjusted accordingly. Also, the boundary voltage can be approached from a value above Vp for boundary voltage determination, in a similar manner as that in the PAM-2 scheme.

Next, the boundary voltage for the bit pattern "10" is determined. Also, the calibration circuit provides a reference threshold voltage 1402 of Vp*⅔ as the initial offset for the up eye. It is to be understood that the value ⅔ is exemplary only, other values, such as ¾, are possible. During a second clock cycles, when "Data_3"=0 and "Data_2"=1 occur, it is considered that the bit pattern "10" occurs. For the second clock cycles, a first count of the bit pattern "10" is counted by the Ref counter. The reference threshold voltage is decreased, for example from the voltage 1402 to the voltage 1408. During another second cycles, when "Data_1"=0 and "Data_2"=1 occur, it is considered that the bit pattern "10" occurs. For the second clock cycles, a second count of the bit pattern "10" is counted by the Comp counter. A ratio "Kr" is determined between the second and first counts, and "Kr" is defined to divide the second count by the first count. If "Kr" is greater than a predetermined value "Kpd", such as ½, the reference threshold value continues to decrease, and the above process is repeated. If "Kr" is determined to be less than or equal to "Kpd", the boundary voltage 1410 for bit pattern "10" is determined as "RH_1".

It is to be understood that the above approach is only an example implementation, without suggesting any limitation as to the scope of the present disclosure. Any other suitable implementations are possible as well. For example, the Comp counter may take a count of "Data_3"=0 and "Data_2"=1, and the "Kpd" may be adjusted accordingly. Also, the boundary voltage can be approached from a value of 0 for boundary voltage determination, in a similar manner as that in the PAM-2 scheme.

Next, the threshold voltage Voff_1 is calibrated for normal operation. In an embodiment of the present disclosure, the threshold voltage Voff_1 is calibrated to be (RH_h+RH_1)/2, as show in FIG. 15. It is to be understood that the above approach is only an example implementation, without suggesting any limitation as to the scope of the present disclosure. Any other suitable implementations are possible as well.

Figure 14D:
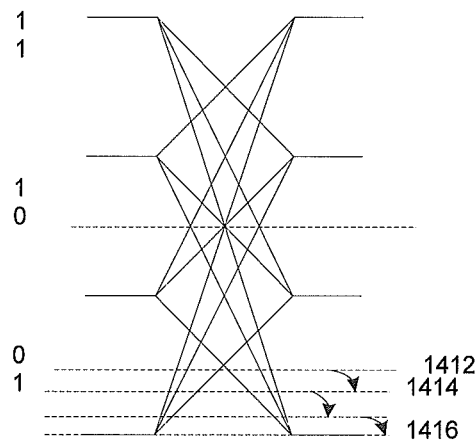

Next, the boundary voltage for the bit pattern "00" is determined, as shown in FIG. 14D. An initial reference threshold voltage is provided, and the reference threshold voltage is set to be minus Voff_1 1412. It is to be understood that minus Voff_1 is exemplary only, other values are possible. During a second clock cycles, when "Data_1"=0 and "Data_2"=0 occur, it is considered that the bit pattern "00" occurs. For a second clock cycles, a first count of the bit pattern "00" is counted by the Ref counter. The reference threshold voltage is decreased, for example from the voltage 1412 to the voltage 1414. During another second cycles, when "Data_3"=0 and "Data_2"=0 occur; it is considered that the bit pattern "00" occurs. For the second clock cycles, a second count of the bit pattern "00" is counted by the Comp counter. A ratio "Kr" is determined between the second and first counts, and "Kr" is defined to divide the second count by the first count. If "Kr" is greater than a predetermined value "Kpd", such as ½, the reference threshold value continues to decrease, and the above process is repeated. If "Kr" is determined to be less than or equal to "Kpd", the boundary voltage 1416 for bit pattern "00" is determined as "RL_1".

It is to be understood that the above approach is only an example implementation, without suggesting any limitation as to the scope of the present disclosure. Any other suitable implementations are possible as well. For example, the Comp counter may take a count of "Data_1"=0 and "Data_2"=0, and the "Kpd" may be adjusted accordingly. Also, the boundary voltage can be approached from a value of 0 for boundary voltage determination, in a similar manner as that in the PAM-2 scheme.

Figure 14E:
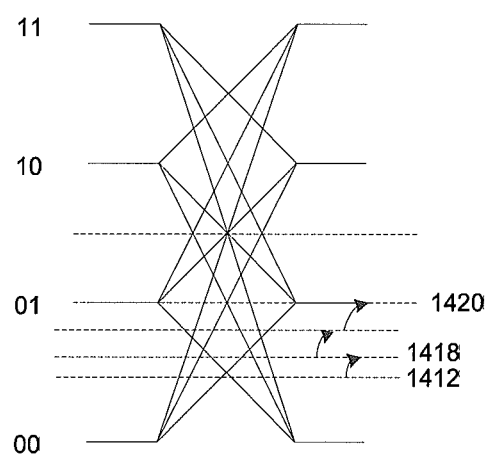

Next, the boundary voltage for the bit pattern "01" is determined, as shown in FIG. 14E. An initial reference threshold voltage is provided, and the reference threshold voltage is set to be minus Voff_1 1412. It is to be understood that minus Voff_1 is exemplary only, other values are possible. During a second clock cycles, when "Data_1"=1 and "Data_2"=0 occur, it is considered that the bit pattern "01" occurs. For a second clock cycles, a first count of the bit pattern "01" is counted by the Ref counter. The reference threshold voltage is increased, for example from the voltage 1412 to the voltage 1418. During another second cycles, when "Data_3"=1 and "Data_2"=0 occur; it is considered that the bit pattern "01" occurs. For the second clock cycles, a second count of the bit pattern "01" is counted by the Comp counter. A ratio "Kr" is determined between the second and first counts, and "Kr" is defined to divide the second count by the first count. If "Kr" is greater than a predetermined value "Kpd", such as ½, the reference threshold value continues to increase, and the above process is repeated. If "Kr" is determined to be less than or equal to "Kpd", the boundary voltage 1420 for bit pattern "01" is determined as "RL_h".

It is to be understood that the above approach is only an example implementation, without suggesting any limitation as to the scope of the present disclosure. Any other suitable implementations are possible as well. For example, the Comp counter may take a count of "Data_1"=0 and "Data_2"=0, and the "Kpd" may be adjusted accordingly. Also, the boundary voltage can be approached from a value of 0 for boundary voltage determination, in a similar manner as that in the PAM-2 scheme. In an embodiment of the present disclosure, it is also possible to determine the boundary voltages based on the ratio "Kr" by referring to a look-up table storing relationship between "Kr" and the boundary voltages, for example.

Figure 15:
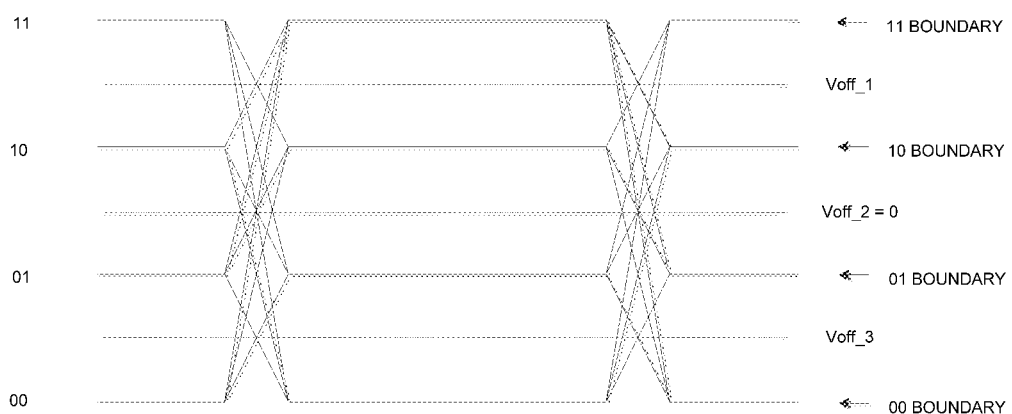
FIG. 15 is a schematic diagram illustrating threshold voltage calibration in accordance with an embodiment of the present disclosure.

Next, the threshold voltage Voff_3 is calibrated for normal operation. In an embodiment of the present disclosure, the threshold voltage Voff_3 is calibrated to be (RL_h+RL_1)/2, as shown in FIG. 15. It is to be understood that the above approach is only an example implementation, without suggesting any limitation as to the scope of the present disclosure. Any other suitable implementations are possible as well.

It is to be understood that, the above determination sequence is exemplary only, without suggesting any limitation as to the scope of the present disclosure. Any other suitable sequences are possible as well.

Figure 12A:
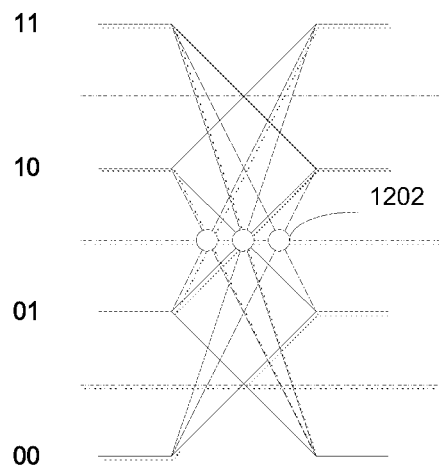
FIGS. 12A and 12B are schematic diagrams illustrating transition edges in the signal stream of FIG. 11.
Figure 12B:
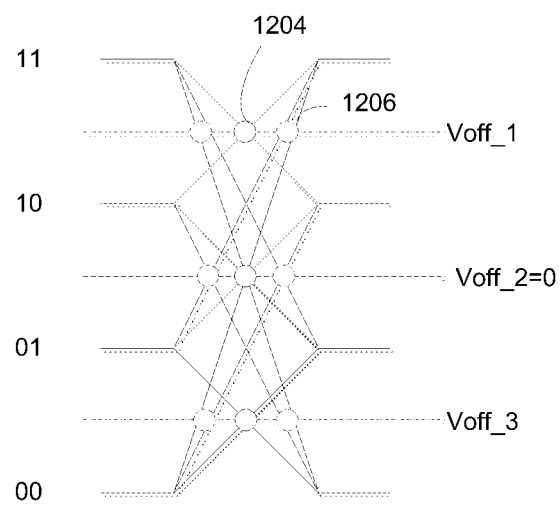

After the threshold voltage calibration is completed, the threshold voltages Voff_1 and Voff_3 are fixed. Four bit patterns "11", "10", "01" and "00" as shown in FIG. 11 can be recognized by the samplers correctly. The state machine controls the device to enter the stage of clock recovering, such as step 408 of FIG. 4. In order to accurately recover a clock, such as the signals "Clock_p" and "Clock_d", from the signal stream, transition edges need to be selected. Central cross points (transition from "10" to "11" and transition from "11" to "10" at the first sampler path, transition from "01" to "10", transition from "10" to "01", transition from "00" to "11" and transition from "11" to "00" at the second sampler path, and transition from "00" to "01" and transition from "01" to "00" at the third sampler path) are selected as effective transition edges, which are depicted with solid circles in FIG. 12B. Transition from "11" to "01", transition from "11" to "00", transition from "01" to "11" and transition from "00" to "11" at the first sampler path, transition from "10" to "00", transition from "01" to "11", transition from "11" to "01" and transition from "00" to "10" at the second sampler path, and transition from "00" to "11", transition from "00" to "10", transition from "11" to "00" and transition from "10" to "00" at the third sampler path are determined to be bad transition edges, which are depicted with dashed circle as shown in FIG. 12B. The effective transition edges are used by the CDR 1006 for CDR fine lock such that an accurate clock can be recovered. The recovering principle for the CDR 1006 is similar to that for the CDR 606. The recovered signals "Clock_d" and "Clock_p" are illustrated with respect to data stream in FIG. 13. As shown, "Clock_d" and "Clock_p" are shift from each other by 180°.

After the recovering and waiting for a second time duration, the state machine controls the device to enter the stage of normal operation. It is appreciated that the threshold voltage can be automatically calibrated without convention need for special training pattern or manual setting. Thus, the accuracy of PAM signal stream transmission is improved.

Although the device of the present disclosure is described to comprise separate components, it is to be understood that at least some of these components can be implemented integrally in some embodiments.

Further, although embodiments of the present disclosure are described with respect to the PAM-2 transmission system and the PAM-4 transmission system, it is to be understood that the calibration method and the device of the present disclosure can also be applied to other PAM transmission systems, such as PAM-8 and PAM-16, etc.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A method comprising:
   receiving a signal stream modulated with pulse amplitude modulation (PAM) associated with a plurality of bit patterns;
   determining boundary voltages for the plurality of bit patterns, each of the boundary voltages being associated with one of the plurality of bit patterns, wherein determining the boundary voltages comprises, for a target bit pattern of the plurality of bit patterns:
      determining a first count associated with the target bit pattern in a first plurality of clock cycles based on a reference threshold voltage;
      varying the reference threshold voltage based on the target bit pattern; and
      determining a second count associated with the target bit pattern in the first plurality of clock cycles based on the varied reference threshold voltage, wherein the boundary voltage for the target bit pattern is based on the first and second counts; and
   calibrating, based on the boundary voltages, a threshold voltage for use in recognition of the plurality of bit patterns.

2. The method of claim 1, further comprising:
   recovering a clock for the signal stream,
   wherein the boundary voltages are based on the recovered clock.

3. The method of claim 1, further comprising:
   recovering a clock for the signal stream after calibrating the threshold voltage.

4. The method of claim 2, wherein the recovering the clock comprises:
   determining a transition edge of a sampled signal stream associated with the received signal stream; and
   determining, based on the transition edge, a phase clock and a data clock that are shifted from each other.

5. The method of claim 1, further comprising:
   determining a peak voltage for the signal stream,
   wherein the boundary voltages are based on the peak voltage.

6. The method of claim 5, wherein determining the peak voltage comprises:

comparing an initial threshold voltage with voltages of the received signal stream in a second plurality of clock cycles;

in response to the voltages of the signal stream exceeding the initial threshold voltage in at least one of the second plurality of clock cycles, increasing the initial threshold voltage to obtain an increased threshold voltage; and in response to the voltages of the signal stream being below the increased threshold voltage in the second plurality of clock cycles, determining the increased threshold voltage to be the peak voltage.

7. The method of claim 1, wherein determining the boundary voltage for the target bit pattern comprises:

determining a ratio between the second and first counts; and in response to the ratio changing from a value less than a predetermined ratio to a value greater than the predetermined ratio or changing from a value greater than the predetermined ratio to a value less than the predetermined ratio, determining the boundary voltage for the target bit pattern based on the varied reference threshold voltage.

8. The method of claim 1, wherein calibrating the threshold voltage comprises:

determining the threshold voltage as a median voltage of adjacent boundary voltages for two of the plurality of bit patterns.

9. The method of claim 1, wherein the threshold voltage is a first threshold voltage, the method further comprising:

subtracting, using an adder of a sampler, a second threshold voltage from voltages of the signal stream; and converting, using a slicer of the sampler, output of the adder into a sampled signal stream associated with the plurality of bit patterns, wherein the determining the boundary voltages is based on the sampled signal stream.

10. A device comprising:

at least one sampler operable to receive a signal stream modulated with pulse amplitude modulation (PAM) associated with a plurality of bit patterns, wherein the at least one sampler comprises:

an adder operable to subtract a first threshold voltage from voltages of the signal stream; and a slicer connected to the adder and operable to convert output of the adder into a sampled signal stream associated with the plurality of bit patterns; and a calibration circuit coupled to the at least one sampler and operable to:

determine boundary voltages for the plurality of bit patterns; and calibrate, based on the boundary voltages, a second threshold voltage for use in recognition of the plurality of bit patterns.

11. The device of claim 10, further comprising:

a clock and data recovery (CDR) circuit operable to recover a clock for the signal stream.

12. The device of claim 11, wherein the CDR circuit comprises an edge selection circuit operable to determine a transition edge of the sampled signal stream associated with the received signal stream; and the CDR circuit is operable to determine, based on the transition edge, a phase clock and a data clock that are shifted from each other.

13. The device of claim 10, wherein the calibration circuit is further operable to:

for a target bit pattern of the plurality of bit patterns, determine a first count associated with the target bit pattern in a first plurality of clock cycles based on a reference threshold voltage;

vary the reference threshold voltage based on the target bit pattern;

determine a second count associated with the target bit pattern in the first plurality of clock cycles based on the varied reference threshold voltage; and determine the boundary voltage for the target bit pattern based on the first and second counts.

14. The device of claim 13, wherein the calibration circuit comprises:

a reference counter coupled to the at least one sampler and configured to determine the first count associated with the target bit pattern;

timing control logic operable to vary the reference threshold voltage based on the target bit pattern; and a comparison counter coupled to the at least one sampler and configured to determine the second count associated with the target bit pattern, the timing control logic being further operable to determine the boundary voltage for the target bit pattern based on the first and second counts.

15. The device of claim 14, wherein the timing control logic is further operable to:

determine a ratio between the second and first counts; and in response to the ratio changing from a value less than a predetermined ratio to a value greater than the predetermined ratio or changing from a value greater than the predetermined ratio to a value less than the predetermined ratio, determine the boundary voltage for the target bit pattern based on the varied reference threshold voltage.

16. The device of claim 10, wherein the calibration circuit is operable to calibrate the second threshold voltage by determining the second threshold voltage as a median voltage of adjacent boundary voltages for two of the plurality of bit patterns.

17. A device comprising:

at least one sampler operable to:

receive a signal stream modulated with pulse amplitude modulation (PAM) associated with a plurality of bit patterns; and compare an initial threshold voltage with voltages of the received signal stream in a first plurality of clock cycles; and a calibration circuit coupled to the at least one sampler and operable to:

determine, with the at least one sampler, a peak voltage by:

in response to the voltages of the signal stream exceeding the initial threshold voltage in at least one of the first plurality of clock cycles, increasing the initial threshold voltage to obtain an increased threshold voltage; and in response to the voltages of the signal stream being below the increased threshold voltage in the first plurality of clock cycles, determining the increased threshold voltage to be the peak voltage;

determine boundary voltages for the plurality of bit patterns based on the peak voltage; and calibrate, based on the boundary voltages, a threshold voltage for use in recognition of the plurality of bit patterns.

* * * * *